United States Patent
Barrett et al.

(10) Patent No.: US 6,469,476 B1
(45) Date of Patent: Oct. 22, 2002

(54) MULTI-MODE CONVERTER FOR A MOTOR VEHICLE ELECTRICAL SYSTEM

(75) Inventors: Alfred H. Barrett, Carmel, IN (US); Gary A. Cameron, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/688,958

(22) Filed: Oct. 17, 2000

(51) Int. Cl.$^7$ .............................. H02H 7/06; H02P 9/00; H02P 11/00; H02K 7/06
(52) U.S. Cl. ............................ 322/29; 318/14; 322/28; 322/24
(58) Field of Search .................... 322/29; 323/224; 363/44; 318/459, 139

(56) References Cited

U.S. PATENT DOCUMENTS

| | | | | | |
|---|---|---|---|---|---|
| 3,675,117 A | * | 7/1972 | Reimers | .................. | 322/31 |
| 3,939,387 A | * | 2/1976 | Maeda | .................. | 318/805 |
| 4,419,618 A | | 12/1983 | Gretsch | .................. | 322/7 |
| 4,695,776 A | * | 9/1987 | Dishner et al. | .................. | 290/4 C |
| 4,743,812 A | * | 5/1988 | Dishner | .................. | 290/4 C |
| 4,827,393 A | | 5/1989 | Clark | .................. | 363/79 |
| 5,061,889 A | * | 10/1991 | Iwatani et al. | .................. | 322/28 |
| 5,214,358 A | * | 5/1993 | Marshall | .................. | 318/139 |
| 5,262,930 A | * | 11/1993 | Hua et al. | .................. | 363/21 |
| 5,373,195 A | * | 12/1994 | De Doncker et al. | .................. | 307/45 |
| 5,402,054 A | | 3/1995 | Eckersley | .................. | 318/801 |
| 5,483,146 A | | 1/1996 | Schultz et al. | .................. | 322/7 |
| 5,668,707 A | * | 9/1997 | Barrett | .................. | 363/44 |
| 5,710,699 A | * | 1/1998 | King et al. | .................. | 363/132 |
| 5,719,484 A | * | 2/1998 | Taniguchi et al. | .................. | 322/20 |
| 5,747,959 A | * | 5/1998 | Iijima et al. | .................. | 318/375 |
| 5,757,151 A | * | 5/1998 | Donegan et al. | .................. | 318/150 |
| 5,912,552 A | * | 6/1999 | Tateishi | .................. | 323/285 |
| 5,946,206 A | * | 8/1999 | Shimizu et al. | .................. | 363/65 |
| 5,982,154 A | * | 11/1999 | Kanazawa et al. | .................. | 322/28 |
| 6,034,513 A | * | 3/2000 | Farrington et al. | .................. | 323/222 |
| 6,198,261 B1 | * | 3/2001 | Shultz et al. | .................. | 323/272 |

* cited by examiner

Primary Examiner—Nestor Ramirez
Assistant Examiner—Julio Cesar Gonzalez
(74) Attorney, Agent, or Firm—Jimmy L. Funke

(57) ABSTRACT

An improved motor vehicle electrical system includes a flexible topology DC-to-DC converter for coupling an engine-driven alternator to vehicle electrical loads at a mode-dependent transfer ratio. The output voltage of the alternator is regulated based the load voltage, and the converter is operable in one of a number of different modes based on engine speed, including a forward boost mode, a forward unity mode, and a forward buck mode. In the forward boost mode, the converter output voltage is boosted above that of the alternator to enable battery charging at low engine speeds; in the forward unity mode, the alternator output voltage is transferred to the battery and electrical loads at a unity transfer ratio; and in the forward buck mode, the converter output voltage is reduced below that of the alternator to enhance the alternator power output at medium-to-high engine speeds. In applications where a single electrical machine is utilized for both starting and generating functions, the converter is capable of operation in a reverse buck mode during engine starting for purposes of increasing the current supplied to the machine.

4 Claims, 2 Drawing Sheets

| MODE | TR | ES RANGE | Q1/Q4 | Q2/Q3 | Q5 | Q6 | Q7 | Q8 |
|---|---|---|---|---|---|---|---|---|
| FORWARD | 1:2 | IDLE-LOW | ON | OFF | OFF | ON | ON | ON |
| BOOST | | | OFF | ON | ON | OFF | ON | ON |
| | | | | | | | | |
| FORWARD | 1:1 | LOW-MED | OFF | OFF | ON | ON | ON | ON |
| UNITY | | | OFF | OFF | ON | ON | ON | ON |
| | | | | | | | | |
| FORWARD | 3:2 | MED-HIGH | ON | OFF | ON | ON | ON | OFF |
| BUCK | | | OFF | ON | ON | ON | OFF | ON |
| | | | | | | | | |
| REVERSE | 2:1 | SUB-IDLE | OFF | ON | ON | OFF | ON | ON |
| (START) | | | ON | OFF | OFF | ON | ON | ON |

MULTI-MODE CONVERTER FOR A MOTOR VEHICLE ELECTRICAL SYSTEM

TECHNICAL FIELD

The present invention is directed to motor vehicle electrical systems including a storage battery and an engine-driven alternator, and more particularly to a multi-mode converter for coupling the storage battery to the alternator.

BACKGROUND OF THE INVENTION

In general, a motor vehicle electrical system derives its power from a 12-volt storage battery and an engine-driven alternator, which also supplies charging current to the storage battery during engine operation. In most powertrain configurations, the engine is designed to operate over a wide speed range, and the alternator is subject to a corresponding speed variation. Thus, while the battery voltage is relatively constant under most operating conditions, the alternator produces an output voltage that varies in proportion to its shaft speed. To reconcile the inherent incompatibility, a voltage regulator controls the excitation of an alternator field winding to maintain the alternator output voltage at a desired value, such as 14-volts. Unfortunately, this significantly restricts the alternator's efficiency and available power output.

Various proposals foe improving the efficiency and power output of an engine driven alternator utilize a converter arrangement to better match the alternator to the load circuit. For example, the U.S. Pat. No. 4,419,618 proposes coupling the alternator to the output rectifier bridge and load circuit through a multiple-tap transformer in which one of a number of possible connections between the alternator output windings and the transformer is selected based on the alternator shaft speed. Another approach, disclosed in the U.S. Pat. Nos. 4,827,393 and 5,483,146, for example, proposes coupling the alternator to the load circuit through a switching DC-to-DC converter, where the converter switching duty-cycle is controlled to regulate the converter output voltage to a desired load voltage. The U.S. Pat. No. 4,827,393 applies to a permanent magnet alternator, whereas the U.S. Pat. No. 5,483,146 applies to a wound field alternator.

While the above-mentioned proposals are capable of improving the efficiency and power output of an engine driven alternator, they also have limited functionality and are relatively expensive to implement due to the required hardware and control electronics. For example, the system described in U.S. Pat. No. 4,419,618 requires an expensive and bulky transformer and numerous bi-directional semiconductor switches. The systems described in U.S. Pat. Nos. 4,827,393 and 5,483,146 require continuous variable duty cycle control and operate only in a buck mode. Accordingly, what is desired is a converter arrangement that is more flexible and less costly to implement. Additionally, it would be desirable for the converter to have the capability of operating in a reverse mode for vehicles having a single machine that performs both generating and engine starting functions.

SUMMARY OF THE INVENTION

The present invention is directed to an improved motor vehicle electrical system including an engine-driven alternator and a flexible topology DC-to-DC converter coupling the alternator to the vehicle storage battery and electrical loads, where the output of the alternator is regulated based on the load voltage, and the converter is operable in one of a number of different modes based on engine or alternator speed, including a forward boost mode, a forward unity mode, and a forward buck mode. In the forward boost mode, the converter output voltage is boosted above that of the alternator to enable battery charging at low engine speeds; in the forward unity mode, the alternator output voltage is transferred to the battery and electrical loads at a unity transfer ratio; and in the forward buck mode, the converter output voltage is reduced below that of the alternator to enhance the alternator power output at medium-to-high engine speeds. In applications where a single electrical machine is utilized for both starting and generating functions, the converter is capable of operation in a reverse buck mode during engine starting for purposes of increasing the current supplied to the machine.

The simple converter topology enables flexible operation at a low cost, and the control electronics is simplified because the converter switches can be modulated at a fixed frequency and duty cycle during the boost and buck modes. The availability of both forward boost and forward buck modes enables the alternator to be designed for lower voltage, higher current operation, thereby increasing its operating efficiency at higher engine speeds.

DESCRIPTION OF THE PREFERRED EMBODIMENT

Figures 1, 2:
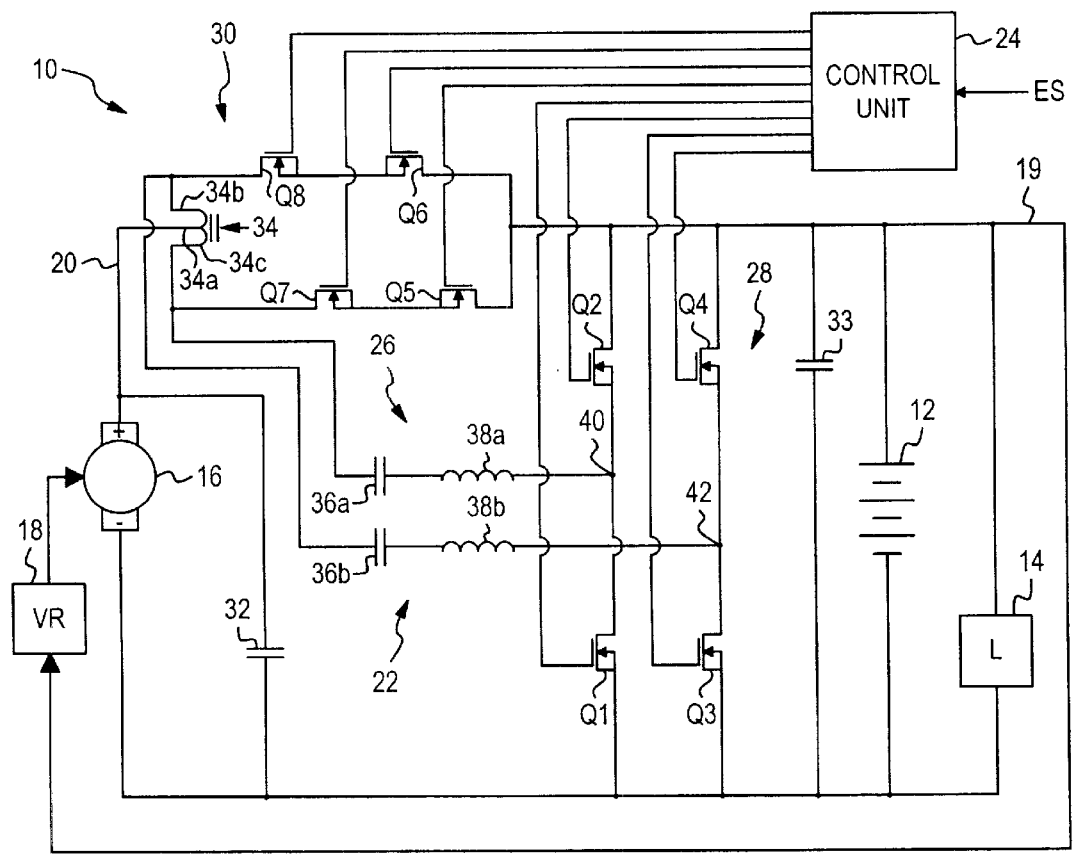
FIG. 1 is a circuit diagram of an automotive electrical system according to this invention, including a DC-to-DC converter and an electronic control logic unit.
FIG. 2 is a table depicting a semiconductor switch control carried out by the,electronic control logic unit of FIG. 1.

Referring to FIG. 1, the reference numeral 10 generally designates an automotive electrical system, including a 12-volt storage battery 12, one or more electrical loads (L) 14 connected in parallel with battery 12, an engine-driven alternator 16 with an internal rectifier bridge, and a voltage regulator (VR) 18 for controlling the excitation of an alternator field winding (not shown) for purposes of regulating the alternator output voltage on line 19. In a conventional configuration, the alternator output line 20 is directly coupled to line 19 so that the voltage regulator 18 directly regulates the alternator output voltage; according to the present invention, however, the output line 20 is coupled to line 19 through a multi-mode DC-to-DC converter, generally designated by the reference numeral 22.

The DC-to-DC converter 22 is a flexible topology series resonant converter capable of operating in one of a number of modes providing different fixed transfer ratios. The converter operation is controlled by control unit 24, which controls the conduction state of a number of MOS transistors Q1–Q8 based on engine speed ES. The modes include a forward boost mode in which the converter output voltage on line 19 is increased above the alternator output voltage on line 20 to enable battery charging at low engine speeds, a forward unity mode in which the alternator output voltage on line 20 is transferred to converter output line 19 at a unity transfer ratio, and a forward buck mode in which the converter output voltage on line 19 is decreased below the alternator output voltage on line 20 to enhance the alternator power output at medium-to-high engine speeds. In the illustrated embodiment, the alternator 16 can be operated in a motoring mode for engine cranking, and the converter 22 is capable of operation in a reverse buck mode for purposes of increasing the current supplied to alternator 16.

The converter 22 includes a tank circuit 26, and first and second bridge circuits 28 and 30. Filter capacitors 32, 33 are respectively connected in parallel with alternator 16 and battery 12, and the alternator output line 20 is coupled to converter 22 via the center tap 34*a* of an autotransformer 34. The tank circuit 26 is defined by series resonant capacitors 36*a*, 36*b*, series resonant inductors 38*a*, 38*b*, and the winding pair 34*b*, 34*c* of autotransformer 34. The bridge circuit 28 is defined by the MOS transistors Q1–Q4, which are configured as a full-wave bridge, with one end of the tank circuit 26 being coupled to the junction 40 between transistors Q1 and Q2, and the other end being coupled to the junction 42 between transistors Q3 and Q4. In conventional fashion, the control unit 24 biases transistors Q1 and Q4 on and off in opposition to the transistors Q2 and Q3. Preferably, the transistors Q1–Q4 are biased on and off at a fixed duty cycle, and at a fixed frequency well below the resonant frequency of the tank circuit 26. In a representative mechanization, the tank circuit 26 has a resonant frequency of 300 kHz, and the transistors Q1–Q4 are switched at a duty cycle of 50% (less a suitable under-lap interval) and a frequency of 600 kHz. The bridge circuit 30 is defined by the MOS transistors Q5–Q8, with the transistors Q6 and Q8 being connected in series between line 19 and the winding 34*b* of autotransformer 34, and the transistors Q5 and Q7 being connected in series between line 19 and the winding 34*c* of autotransformer 34.

The chart of FIG. 2 summarizes the transistor switching carried out by the control unit 24 according to this invention. There are two rows of transistor on/off states for each of the various modes of operation, the upper row representing the first half of each switching period, and the lower row representing the last half of each switching period. The engine speed ES in generating operation is categorized into three ranges: idle-to-low, low-to-medium and medium-to-high. In the idle-to-low engine speed range, the alternator 16 has primarily a low-voltage generating capability, and the forward boost mode establishes a 1:2 transfer ratio for improved battery charging. In this case, the bridge transistors Q1–Q4 are switched on and off as shown in the first two rows of the chart of FIG. 2, the transistors Q7 and Q8 are biased on continuously, and the transistors Q5 and Q6 are switched on and off as shown to full-wave rectify the boosted alternator voltage. As a result, the alternator 16 sees the 12-volt battery 12 as a 6-volt load. In the low-to-medium engine speed range, the forward unity mode establishes a unity, or 1:1, transfer ratio. In this case, bridge transistors Q1–Q4 are continuously off, and the transistors Q5–Q8 are continuously on, directly coupling alternator output line 20 to line 19. In the medium-to-high speed range, the alternator 16 has primarily a high-voltage generating capability, and the forward buck mode establishes a 3:2 transfer ratio. In this case, the bridge transistors Q1–Q4 are biased on and off as in the forward boost mode, the transistors Q5 and Q6 are biased on continuously, and the transistors Q7 and Q8 are switched on and off as shown to half-wave rectify the alternator voltage. As a result, the alternator 16 sees the 12-volt battery 12 as a 18-volt load. In the cranking (reverse) mode, the engine speed is sub-idle, and the reverse mode provides a 2:1 transfer ratio. In this case, the transistors Q7–Q8 are continuously on, and the transistors Q1–Q6 are switched opposite to the forward boost mode, which has the effect of lowering the voltage at the alternator 16 while boosting the supplied current for improved cranking torque production.

Figure 3:
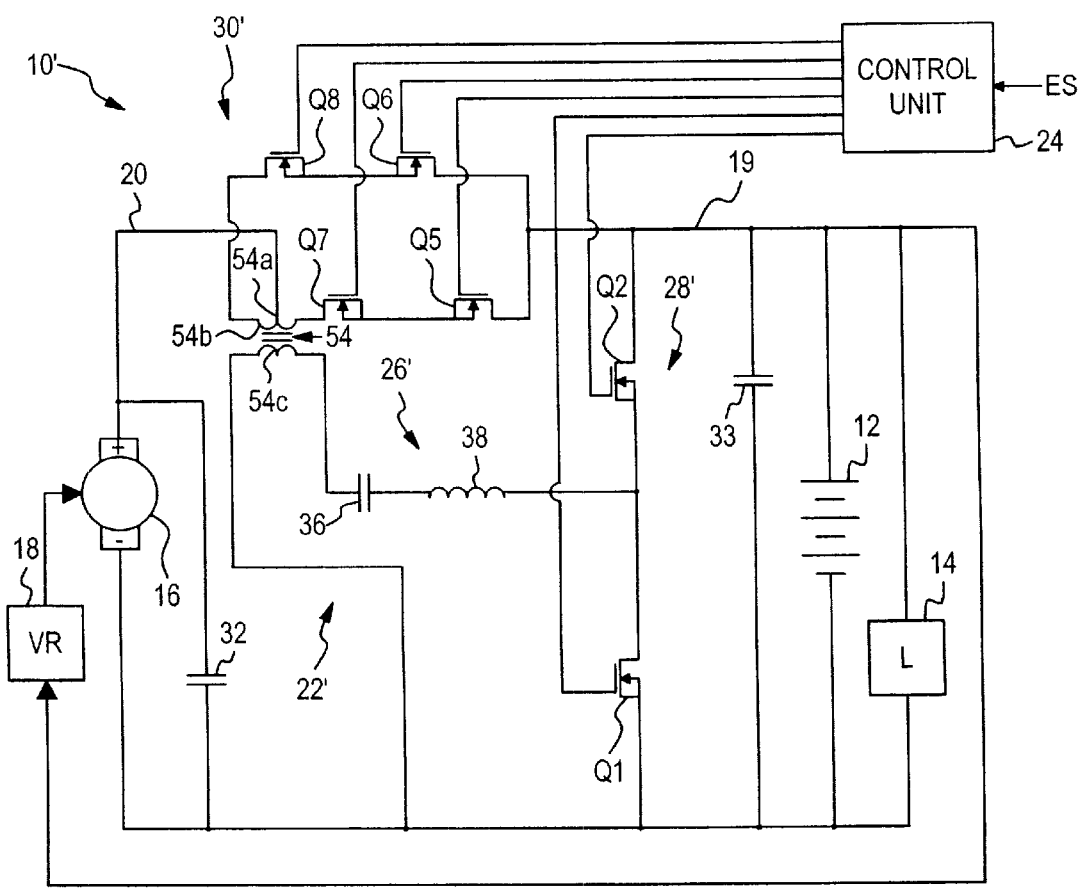
FIG. 3 is a circuit diagram of an alternate embodiment of the DC-to-DC converter of FIG. 1.

FIG. 3 illustrates an electrical system 10' with a converter 22' having a topology similar to that of FIG. 1, but with two modifications considered to be within the scope of this invention. One modification is in the bridge circuit 28'; the converter of FIG. 3 features a half-wave bridge configuration in which transistors Q3 and Q4 are omitted and one side of the tank circuit 26' is coupled to the negative terminal of battery 12. The other modification is that alternator 16 is coupled to bridge circuit 30' with an isolation transformer 54; in this case, the alternator output line 20 is connected to the center tap 54*a* of secondary winding 54*b*, primary winding 54*c* is included in tank circuit 26', and the capacitors 36*a*, 36*b* and inductors 38*a*, 38*b* of FIG. 1 are combined as unitary capacitor 36 and inductor 38, respectively.

In summary, the illustrated converter topologies provide a low cost approach for achieving high alternator efficiency in a vehicle electrical system. The alternator efficiency may be further increased by using Schottky diodes for the internal rectifier bridge of alternator 16; ordinarily, it is not practical to use Schottky diodes in the rectifier bridge due to their high leakage current when the engine is not running, but with the illustrated converter topologies, the alternator 16 is connected to the battery 12 through the converter MOS transistors, which limit the leakage current to a very small value.

While the present invention has been described in reference to the illustrated embodiments, it will be recognized that various modifications in addition to those mentioned above will occur to those skilled in the art. For example, several different reduced functionality configurations are possible. If only the forward boost and forward unity modes are utilized, transistors Q7 and Q8 can be eliminated; in this case, transistors Q5 and Q6 can be replaced with rectifiers at the expense of efficiency. If only the forward unity and forward buck modes are utilized, transistors Q5 and Q6 can be eliminated; in this case, transistors Q1, Q2, Q3 and Q4 can be replaced with rectifiers, also at the expense of efficiency. Finally, if only the forward unity and the reverse (start) modes are utilized, transistors Q7 and Q8 can be eliminated. Accordingly, it will be understood that vehicle electrical systems incorporating these and other modifications may fall within the scope of this invention, which is defined by the appended claims.

What is claimed is:

1. A motor vehicle electrical system, including a storage battery connected to supply power to electrical loads and an alternator driven by a vehicle engine for generating electrical power during operation of the engine, and further comprising:

a DC-to-DC resonant converter coupled between the alternator and the storage battery, and operable to supply generated electrical power to the storage battery in a selected one of a plurality of modes providing different voltage transfer ratios between the alternator and storage battery, including a forward boost mode in which the converter supplies power to the storage battery at an output voltage which is higher than that generated by the alternator and a forward unity mode in which the voltage generated by the alternator is transferred to the storage battery at a unity transfer ratio; and control means for obtaining a speed of the engine or alternator, determining which of a plurality of predefined speed ranges said speed is within, selecting the forward boost mode when said speed is in a first speed range including an idle speed of the engine, and selecting the forward unity mode when said speed is in a second speed range above said first speed range.

2. A motor vehicle electrical system, including a storage battery connected to supply power to electrical loads and an alternator driven by a vehicle engine for generating electrical power during operation of the engine, and further comprising:
- a DC-to-DC resonant converter coupled between the alternator and the storage battery, and operable to supply generated electrical power to the storage battery in a selected one of a plurality of modes providing different voltage transfer ratios between the alternator and storage battery, including a forward unity mode in which the voltage generated by the alternator is transferred to the storage battery and electrical loads at a unity transfer ratio and a forward buck mode in which the converter supplies power to the storage battery at an output voltage which is lower than that generated by the alternator; and
- control means for obtaining a speed of the engine or alternator, determining which of a plurality of predefined speed ranges said speed is within, selecting the forward unity mode when said speed is in a first speed range, and selecting the forward buck mode when said speed is in a second speed range above said first speed range.

3. A motor vehicle electrical system, including a storage battery connected to supply power to electrical loads and an alternator driven by a vehicle engine for generating electrical power during operation of the engine, and further comprising:
- a DC-to-DC resonant converter coupled between the alternator and the storage battery, and operable to supply generated electrical power to the storage battery in a selected one of a plurality of modes providing different voltage transfer ratios between the alternator and storage battery, including a forward boost mode in which the converter supplies power to the storage battery at an output voltage which is higher than that generated by the alternator, a forward unity mode in which the voltage generated by the alternator is transferred to the storage battery at a unity transfer ratio, and a forward buck mode in which the converter supplies power to the storage battery at an output voltage which is lower than that generated by the alternator; and
- control means for obtaining a speed of the engine or alternator, determining which of a plurality of predefined speed ranges said speed is within, selecting the forward boost mode when said speed is in a first speed range including an idle speed of the engine, selecting the forward unity mode when said speed is in a second speed range above said first speed range, and selecting the forward buck mode when said speed is in a third speed range above said second speed range.

4. The motor vehicle electrical system of claims 1, 2 or 3, wherein the alternator is capable of operating in reverse to start the vehicle engine, and the control means operates said converter in a reverse buck mode in which the converter supplies power to the alternator from the storage battery, but at a voltage below that of said storage battery when said speed is in a range below an idle speed of the engine.

* * * * *